United States Patent [19]

Cirkel et al.

[11] Patent Number: 4,630,277
[45] Date of Patent: Dec. 16, 1986

[54] EXCITATION CIRCUIT FOR LASER SYSTEMS, ESPECIALLY FOR TE-HIGH ENERGY LASERS, WITH ADJUSTMENT OF PREIONIZATION

[75] Inventors: Hans-Jürgen Cirkel; Reinhard Müler, both of Erlangen; Elmar Müller-Horsche, Bayreuth, all of Fed. Rep. of Germany

[73] Assignee: Kraftwerk Union Aktiengesellschaft, Mulheim an der Ruhr, Fed. Rep. of Germany

[21] Appl. No.: 601,265

[22] Filed: Apr. 17, 1984

[30] Foreign Application Priority Data

Apr. 19, 1983 [DE] Fed. Rep. of Germany ....... 3314157

[51] Int. Cl.$^4$ ............................................. H01S 3/00
[52] U.S. Cl. ........................................ 372/38; 372/86; 372/83
[58] Field of Search ..................... 372/38, 87, 86, 83

[56] References Cited

U.S. PATENT DOCUMENTS

4,573,160 2/1986 Cirkel et al. ........................ 372/38

Primary Examiner—Léon Scott, Jr.
Attorney, Agent, or Firm—Herbert L. Lerner; Laurence A. Greenberg

[57] ABSTRACT

An excitation circuit for laser systems with excitation by a maximally homogeneous, arc-free capacitor discharge in a gas space of a laser head between at least two mutually spaced-apart laser electrodes includes at least one fast acting high-voltage switch activatable via a pulse-forming network connected thereto for generating high-voltage pulses at the laser electrodes; first and second stripline capacitors and appertaining equivalent inductances operatively associated with the pulse-forming network and the high-voltage switch and the laser head; preionization devices operatively connected to the laser electrodes and having a plurality of members of at least one of surface discharge gap members and preionization rod members, together with auxiliary circuit connected thereto, the auxiliary circuits being connected to the pulse-forming network for providing all auxiliary voltages and currents for operating the preionization devices, the auxiliary circuits being connectible, in addition to ground potential of the excitation circuit, to at least one of three discrete circuit points of which one point is connected to a high-voltage input of the pulse-forming network, a second point is connected to a high-voltage branching point of the high-voltage switch and one of the stripline capacitors, and a third point is connected directly to the laser electrode having high potential, for controlling the instant of onset of the laser gas discharge and the time relationship between applying a high-voltage pulse to the laser electrodes, on the one hand, and applying a firing pulse to poles of the preionization devices, on the other hand.

18 Claims, 17 Drawing Figures

EXCITATION CIRCUIT FOR LASER SYSTEMS, ESPECIALLY FOR TE-HIGH ENERGY LASERS, WITH ADJUSTMENT OF PREIONIZATION

The invention relates to an excitation circuit for laser systems, especially TE high-energy lasers.

Preionizing devices such as with surface discharge gaps are known, for example, from DE-OS No. 30 35 702, and, such as with preionization rods, from DE-OS No. 30 35 730. For the operation of TE-laser or TE-high-energy laser systems, effectively working preionizing devices according to the foregoing German Published Non-Prosecuted Applications are of particular importance, because the onset or setting-in point or instant of preionization must be matched to every laser system, for example, KrF, XeCl, XeF or $CO_2$ systems, and it should be possible, for cost reasons, to practice the preionization with a minimum of technical outlay and low energy consumption.

It is an object of the invention to provide an excitation circuit for laser systems with a preionizing device coordinated therewith, in such a manner that it does justice to the above-mentioned requirements in an effective manner i.e. wherein the expense for circuit-related measures can be kept low. With the foregoing and other objects in view, there is provided, in accordance with the invention, an excitation circuit for laser systems with excitation by a maximally homogeneous, arc-free capacitor discharge in a gas space of a laser head between at least two mutually spaced-apart laser electrodes comprising at least one fast acting high-voltage switch activatable via a pulse-forming network connected thereto for generating high-voltage pulses at the laser electrodes; first and second stripline capacitors and appertaining equivalent inductances operatively associated with the pulse-forming network and the high-voltage switch and the laser head; preionization devices operatively connected to the laser electrodes and having a plurality of members of at least one of surface discharge gap members and preionization rod members, together with auxiliary circuits connected thereto, the auxiliary circuits being connected to the pulse-forming network for providing all auxiliary voltages and currents for operating the preionization devices, the auxiliary circuits being connectible, in addition to ground potential of the excitation circuit, to at least one of three discrete circuit points of which one point is connected to a high-voltage input of the pulse-forming network, a second point is connected to a high-voltage branching point of the high-voltage switch and one of the stripline capacitors, and a third point is connected directly to the laser electrode having high potential, for controlling the instant of onset of the laser gas discharge and the time relationship between applying a high-voltage pulse to the laser electrodes, on the one hand, and applying a firing pulse to poles of the preionization devices, on the other hand.

In accordance with another feature of the invention the preionization devices comprise the surface discharge gaps, and the auxiliary circuits of the preionization devices are cooperatively connected to a plurality of the fast-acting switches, and including at least one charging capacitor and a preferably inductive impedance serially connected with a parallel circuit formed of one of the surface discharge gaps and a high impedance, the charging capacitor and the preferably inductive impedance of the auxiliary circuit having relatively small values compared to corresponding capacitors and inductive impedances of the pulse-forming network.

In accordance with an additional feature of the invention the fast-acting high-voltage switch forms part of the auxiliary circuit of the surface discharge gap, the high voltage switch having a high-voltage terminal connected to a junction point of the series connection of the charging capacitor and the preferably inductive impedance.

In accordance with a further feature of the invention the preionization devices comprise the preionization rods disposed at a given breakdown distance from the appertaining laser electrode, a respective auxiliary circuit comprising a switching element for controlling a pulse connection to the preionization rods with adjustable instant of firing and adjustable breakdown voltage, respectively, the instant of firing of the switching element being further controllable by a connection of the high-voltage supply of the auxiliary circuit both to ground potential of the pulse-forming network and to at least the third circuit point connected directly to the high-potential laser electrode.

In accordance with again another feature of the invention, the stripline capacitors have a liquid dielectric, the pulse-forming network being operatable with pulse charging of the stripline capacitors thereof, and being connected on the input side thereof to a pulse charging capacitor via a pulse inductance and a pulse switch.

In accordance with yet a further feature of the invention, a respective auxiliary circuit of one of the preionization devices is a Blümlein switching circuit with a fast-acting high-voltage switch.

In accordance with still an additional feature of the invention, the switching element of the auxiliary circuit connected to the preionization rods is a small spark gap.

In accordance with again a further feature of the invention, the small spark gap is shunted by a small capacitance.

In accordance with still another feature of the invention the auxiliary circuits connected to the preionization devices are connected to the second circuit point of the high-voltage input of the pulse-forming network via an impedance.

In accordance with yet an additional feature of the invention the preionization rods have inner conductors connected directly to the second circuit point of the high-voltage input of the pulse-forming network.

In accordance with again a further feature of the invention the preionization rods of the preionization devices are operable in accordance with the corona discharge principle and are formed of a rod-shaped, electrically conducting electrode core and an insulating dielectric jacket.

In accordance with still an additional feature of the invention the preionization devices comprise the surface discharge gaps, the fast-acting high-voltage switch with the pulse-forming network of a main discharge circuit being common to the auxiliary circuits of the surface discharge gaps, and the auxiliary circuits being connected to the same one of the circuit points to which the pulse-forming network is connected.

In accordance with again another feature of the invention a respective auxiliary circuit is a Blümlein circuit, and the Blümlein auxiliary circuit is connected to the circuit point at a branching point of a shunt capacitance, an inductance and a capacitance of the Blümlein auxiliary circuit, and is connected to the pulse-forming network by an outer end of the inductance at a junction point of the fast-acting high-voltage switch and an inductance of the pulse-forming network.

In accordance with yet another feature of the invention, the laser system is a TE high-energy laser.

In accordance with again a further feature of the invention, the pulse-forming network is a Blümlein circuit.

In accordance with again another feature of the invention, the pulse-forming network is a charge-transfer switching circuit.

In accordance with still an additional feature of the invention, the liquid dielectric is chemically pure water.

In accordance with a concomitant feature of the invention, the small spark gap is an overvoltage arrester.

Other features which are considered as characteristic for the invention are set forth in the appended claims.

Although the invention is illustrated and described herein as embodied in an excitation circuit for laser systems, especially for TE-high-energy lasers, with adjustment of preionization, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

An effective preionizing device is of special importance for the operation of TE lasers. The onset setting-in point of the preionization must be matched to every laser system, for example, KrF, XeCl, XeF or $CO_2$ and, for cost reasons, the preionization should be capable of being operated with a minimum expenditure of technical means and low energy consumption.

Figure 1:
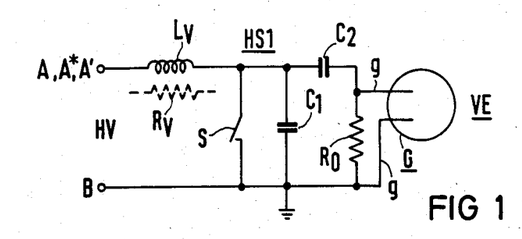
FIG. 1 is a circuit diagram of an auxiliary circuit of a preionizing device with a diagrammatically indicated surface discharge gap or creepage spark gap and a Blümlein switching circuit.

Referring now to the figures of the drawing and first, particularly, to FIG. 1, there is shown the basic electric circuitry of a preionizing device VE which include capacitors $C_1$ and $C_2$ of a Blümlein switching circuit, a surface discharge gap G with two poles g, and a switching element S, such as, a spark gap, for example. The circuit is connected via an inductance $L_V$ or a resistor $R_V$ as an alternative (shown in broken lines) to a high-voltage power supply HV. To save costs, the voltage supply of the laser head is to be jointly used. A highly resistive impedance $R_\omega$, such as a resistor, especially, is shunted across the surface discharge gap G. By highly resistive there is meant having a high resistance compared to the resistance of the fired surface discharge gap G.

Figure 2:
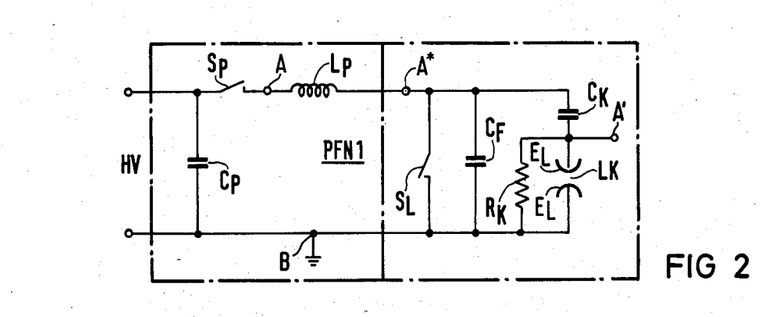
FIG. 2 is a circuit diagram for a laser excitation circuit with an auxiliary circuit according to FIG. 1 connectible at A, A* and A' as well as at B and with pulse charging for the pulse-forming network, which is based on a Blümlein circuit.

FIG. 2 shows the basic electric circuitry of a TE-laser wherein the Blümlein circuit is used as a pulse-forming network PFN1, and a pulse charge of the capacitors is effected by the high voltage HV, as becomes necessary when water is used as the dielectric.

A laser chamber LK is provided including laser electrodes $E_L$. A high impedance $R_K$ in the form of a resistor, especially, is shunted across the laser discharge gap. Further provided are stripline capacitors $C_F$ and $C_K$, a high-voltage switch $S_L$, a ground potential bar B of the pulse-forming network PFN 1 and circuit elements including a pulse-charging capacitance $C_p$, pulse switch $S_p$ and a series inductance $L_p$, which are connected to the pulse-forming network PFN 1 at the input thereof.

Advantageously, the high-voltage supply for the preionization can be picked off at the points A or A* or A', the point A being connected to the high-voltage input of PFN1 between the pulse switch $S_p$ and the inductance $L_p$, the point A* to the upper branching point to the high-voltage switch $S_L$ and to a stripline capacitor $C_F$, and the point A' directly to the lead of the upper laser electrode $E_L$ as shown in FIG. 2.

If the point A is chosen as the tapping point for the preionization, the capacitors $C_1$ and $C_2$ in FIG. 1 are charged while the capacitors $C_F$ and $C_K$ (FIG. 2) are being charged. The charging process occurs in accordance with the generally known laws, so that at any time $t_o+t$ after the switch $S_p$ has closed (time $t_o$), a voltage value U is to be allocated to the capacitors $C_1$ and $C_2$.

At the time $t_o+\epsilon$, the maximum charging voltage of the capacitors $C_F$ and $C_K$ is reached and, by closing the switch $S_L$ (FIG. 2), a voltage is built-up across the electrodes $E_L$ of the laser chamber LK. When the firing voltage of the switch S is reached, the surface discharge gap G breaks down. By varying the firing voltage of the switch S, the preionization time, which lies ahead of the closing of the switch $S_L$, can thus be varied. This applies logically also to the connection of the auxiliary circuit HS 1 to the point A*, a slight delay occurring in the firing of S in this regard relative to the connection to the point A.

Figure 3:
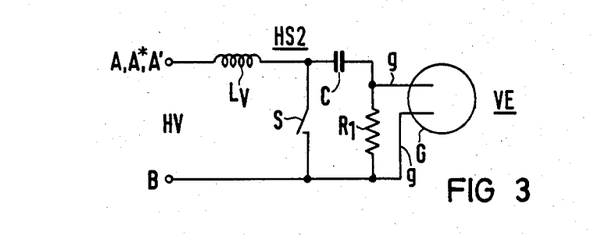
FIG. 3 is a circuit diagram of a simplified auxiliary circuit according to FIG. 1 without the capacitor $C_1$ shown in FIG. 1.

By connecting the preionization device to point A' (FIG. 2), the capacitors $C_1$ and $C_2$ (FIG. 1) are charged up while the voltage is being applied to the laser electrodes. The surface discharge gap G (FIG. 1) breaks down in this embodiment of the invention after the switch $S_L$ has been fired, the instant of breakdown being presettable by adjustment of the firing voltage of the switch S. In a different embodiment of an auxiliary circuit HS2 according to FIG. 3, the capacitor $C_1$ is omitted as compared to FIG. 1; C corresponds to the capacitor $C_2$, and $R_1$ to the impedance $R_o$. The instant when the preionization sets in is controlled in this auxiliary circuit HS2 in a manner corresponding to that in the auxiliary circuit HS1 according to FIG. 1.

Figure 4:
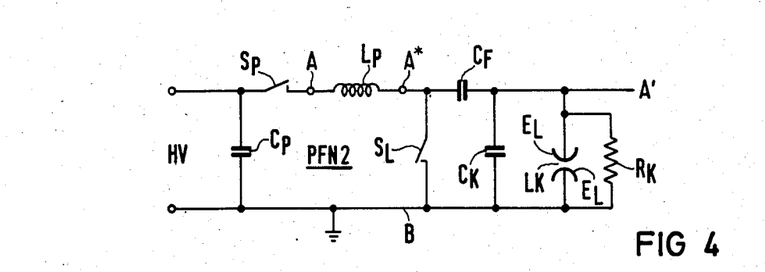
FIG. 4 is a circuit diagram of a pulse-forming network for a laser with pulse charging in an embodiment serving as a charge transfer circuit, likewise having the circuit points A, A* and A' as well as B.

If a charge-transfer circuit PFN2, as shown in FIG. 4, is used as the pulse-forming network for the laser circuit, the measures described for controlling the preionization can be applied analogously. Parts similar to FIG. 2 carry the same reference symbols.

Figure 5:
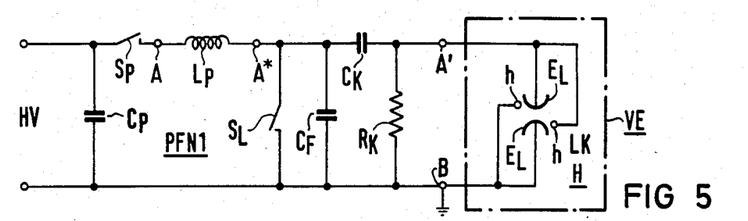
FIG. 5 is a diagram of an excitation circuit with Blümlein switching circuit of a pulse-forming network and pulse charging as well as a different embodiment of the preionizing device with preionizing rods.

Also for the preionization arrangement, possibilities are described hereinafter for freely selecting the instant of onset or application and for enhancing the preionization with low energy consumption. FIG. 5 shows the pulse-forming network PFN1 according to FIG. 2 and, moreover, a switching circuit for preionization, wherein a Blümlein circuit is used as the pulse-forming network PFN for the laser circuit and, for the sake of simplification, only one auxiliary electrode h of the preionization device VE, H is shown, which is associated with a laser electrode $E_L$.

Figure 6:
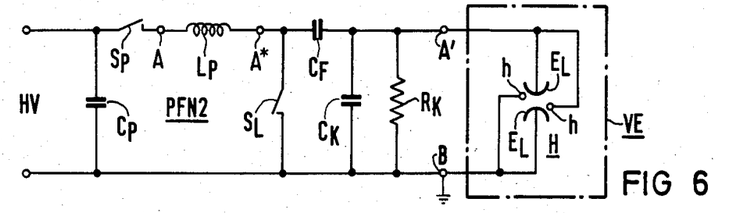
FIG. 6 is a circuit diagram of a preionizing device similar to that of FIG. 5 but with a pulse-forming network as the charge transfer switching circuit.

FIG. 6 shows the same basic arrangement of the preionizing device VE, H with a charge transfer circuit as the pulse-forming network PFN2 of the laser, like parts again bearing the same reference symbols; note also FIG. 4.

To explain the measures for improving the preionization, those parts of the circuits in FIGS. 5 and 6 shown in the box formed by dot-dash lines are considered. The measures described hereinafter are applicable for the excitation of the laser as the pulse-forming network PFN1 and PFN2, respectively, both for the Blümlein circuit as well as for the charge transfer circuit.

Figure 7:
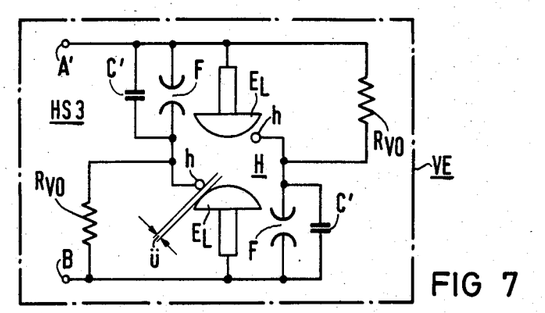
FIG. 7 is a circuit diagram of a first embodiment of the basic preionizing device according to FIGS. 5 and 6, wherein the circuit parts shown in the dot-dash frame in FIGS. 5 and 6 are developed in greater detail, and the connection of the auxiliary circuit is effected at the circuit points A' and B.

In FIG. 7, with the aid of an auxiliary circuit HS3 which is formed of two auxiliary circuit halves identical for each electrode $E_L$, there is shown a possibility for permitting the firing instant of the preionization to be shifted further out. Into the leads of the inner conductors of the firing electrodes and preionizing rods h, respectively, there are inserted small spark gaps F, for example, surge arresters, which may be shunted by small capacitances C'. Before the spark gap F' breaks down, the potential of the inner conductor, due to the capacitive coupling of the inner conductors to the firing electrode with the adjacent electrode $E_L$ (note the breakdown gap ü), remains nearly at the potential of the adjacent electrode, so that a potential difference is formed at both electrodes of the spark gap F. The full potential difference appears between the inner conductor of the firing electrode h and the adjacent electrode $E_L$ only when the spark gap breaks down. By varying the breakdown voltage of the spark gap F, the instant of preionization can be shifted. This auxiliary circuit HS3 is connected directly to the circuit point A' (note FIGS. 5 and 6).

Figure 8:
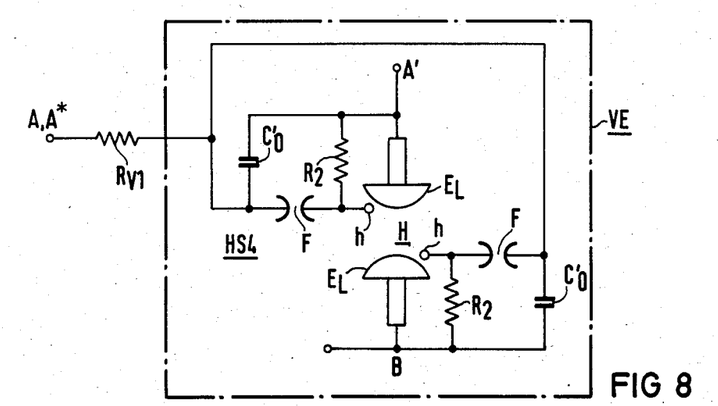
FIG. 8 is a circuit diagram of a second embodiment of the preionizing device with preionizing rods according to FIGS. 5 and 6 in a representation corresponding to that of FIG. 7, wherein the auxiliary circuit is connected on the high-voltage side to the circuit points A or A* via a preimpedance.

FIG. 8 describes an auxiliary circuit HS4 which permits preionizing before the switch $S_L$ of the pulse-forming network PFN11 and PFN2, respectively, is closed. Via an impedance $R_{V1}$, which can be realized as a capacitor, inductance or ohmic resistor, the capacitor $C_o'$ is charged from the point A* of the pulse charging device. The instant the firing voltage of the spark gap F is exceeded, a large potential difference is present between the inner conductor of the firing electrode h and the adjacent electrode $E_L$ and effects the preionization. Parallel to the discharge gap h— $E_L$ is a highly resistive impedance $R_2$, and shunted across this parallel circuit is the series circuit formed of the capacitor $C_o'$ and the spark gap F, the pulse voltage being fed via the impedance $R_1$ to the junction point of $C_o'$ and F. The point A can also be selected as the connecting point instead of the point A* in case the firing pulse for the preionizing device VE is to occur even earlier. Otherwise, the two halves of the auxiliary circuit HS4 correspond to the circuit HS2. In a variation or modification of the circuit according to FIG. 8, the inner conductor of the firing electrode h is connected directly to the points A* or A (FIG. 8a).

Figures 8A, 9, 10:
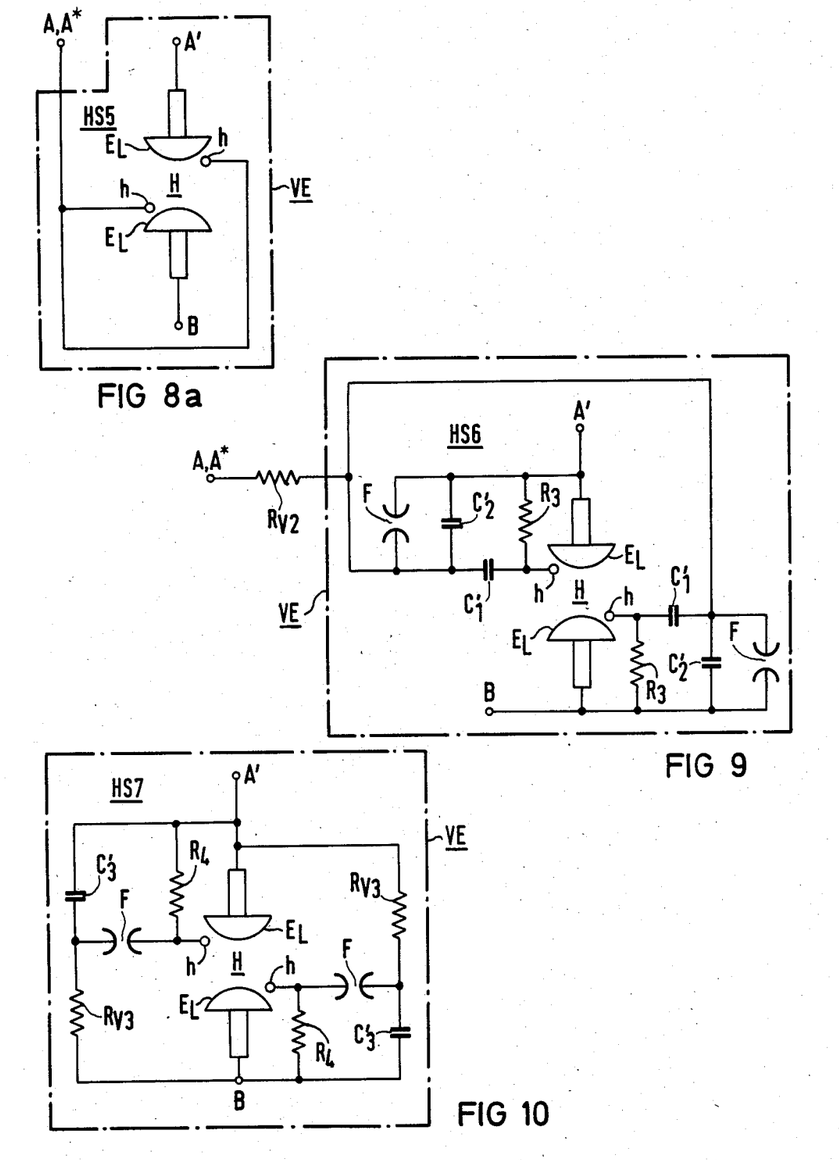
FIG. 8a is a circuit diagram of a third embodiment of the preionizing device with preionizing rods which is highly simplified when compared with FIGS. 7 and 8 and wherein the connection is likewise effected at the circuit points A or A* and B.
FIG. 9 is a circuit diagram of a fourth embodiment of the preionizing device with preionizing rods wherein the auxiliary circuits associated with the two laser electrodes are in the form of a Blümlein circuit and are connected on the high-voltage side to the circuit points A or A* via a series impedance as in the embodiment of FIG. 8.
FIG. 10 is a circuit diagram of a fifth embodiment of the preionizing device with preionizing rods wherein the connection of the auxiliary circuit is effected at the circuit points A' and B of the network according to FIGS. 5 or 6.

FIG. 9 shows a variant or modification of the auxiliary circuit HS4 according to FIG. 8. This auxiliary circuit HS6 permits the attainment of higher potential difference between the inner conductor of the firing electrode h and the adjacent electrode $E_L$, the preionization occurring prior to the closing of the switch S also in the arrangement of FIG. 9. The auxiliary circuit halves are realized as Blümlein circuits; the circuit elements corresponding to the circuit elements $R_O$, $C_1$, $C_2$ and S according to FIG. 1 are identified in FIG. 9 as $R_3$, $C_2'$, $C_1'$ and F, respectively.

The auxiliary circuit HS7 shown in FIG. 10 permits the preionization to be set to an instant after the closing of the switch $S_L$. After the switch $S_L$ is closed, the capacitor $C_3'$ is charged via an impedance $R_{V3}$ (capacitance, inductance or ohmic resistance) until the spark gap breaks down. Thereupon, a corresponding potential difference exists between the inner conductor of the firing electrode h and the adjacent electrode $E_L$. A comparison with FIG. 8 shows that in the auxiliary circuit HS7, the circuit elements $R_4$, F, $C_3'$ and $R_{V3}$ correspond to the circuit elements $R_2$, F, $C_0'$ and $R_{V1}$, respectively, according to FIG. 8 (HS4), the lines containing the series impedance $R_{V3}$, however, not being connected to A or A* but to A' and B, respectively.

Figure 11:
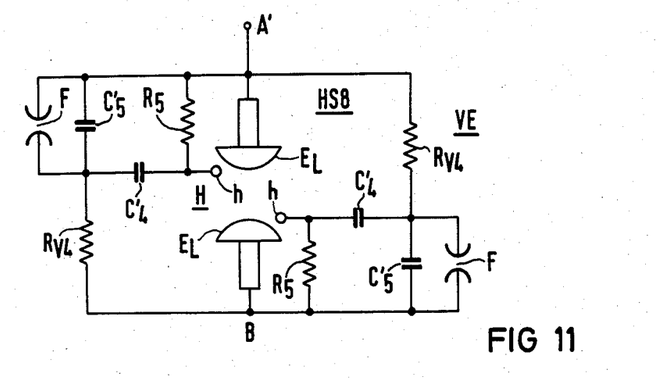
FIG. 11 is a diagram of an auxiliary circuit with Blümlein switching circuits developed further than that in the embodiment of FIG. 10 wherein, as in the embodiment of FIG. 10, the connection is made at the circuit points A' and B of the network according to FIGS. 5 or 6.

The auxiliary circuit HS8, shown in FIG. 11 permits the attainment of a voltage higher than with the auxiliary circuit HS7.

In FIG. 11, the auxiliary circuit halves of the preionization device VE, H are again based upon a Blümlein circuit, as is apparent from a comparison with FIG. 9. Thereby, the voltage which is built-up between the firing electrode H and the corresponding laser electrode $E_L$ can practically be doubled. The circuit elements in FIG. 11 which correspond to the circuit elements $R_3$, $C_1'$, $C_2'$, F according to FIG. 9 are identified by $R_5$, $C_4'$, $C_5'$, F and $R_{V4}$, respectively. The branches with the impedance $R_{V4}$ are connected, analogously to FIG. 10 to point A' or B, instead of A or A*

Figures 12, 13:
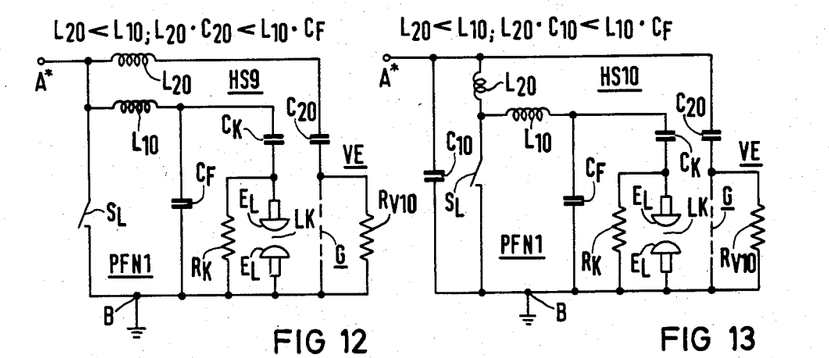
FIG. 12 is a diagram of an auxiliary circuit for a surface discharge gap, the auxiliary circuit being connected to the high voltage of the main circuit which has a high-voltage switch used together with the auxiliary circuit, the main and the excitation circuit, respectively, being in the form of a Blümlein circuit.
FIG. 13 is a circuit diagram of an embodiment of the invention basically like that of FIG. 12, but wherein the auxiliary circuit for the surface discharge gap is supplemented by connecting an additional capacity in shunt to form a second Blümlein circuit.

In the embodiments with the surface discharge gap G according to FIGS. 12 to 15, the L,C-values $L_{20}$ of the auxiliary circuit which serves for coupling the surface discharge gap G to the main circuit are kept small and very small, respectively, in comparison with the L,C-values in the main discharge circuit of the laser i.e. with respect to the C-values of the stripline capacitors $C_K$ and $C_F$ and with respect to the L-values of the impedance $R_K$ and with respect to other inductances contained in the main discharge circuit which result, in particular, from the self-inductance of the laser head, the leads and the stripline capacitors and which are symbolized by the equivalent inductance $L_{10}$. Due to the smaller L-C values of the auxiliary circuit HS9, the preionization device according to FIG. 12 works faster than the main discharge. This is also true for the embodiment according to FIG. 13, wherein the auxiliary circuit HS10 is a Blümlein circuit. An impedance or resistance $R_{V10}$ is shunted across the surface discharge gap G, g, the resistance being high as compared to the resistance of the fired surface discharge gap F, g. The auxiliary circuit HS9 according to FIG. 12 is a series resonance circuit which is connected in series with the surface discharge gap and is connected to the circuit point A*. In FIG. 13, the auxiliary circuit HS9 is supplemented by the parallel capacitance $C_{10}$ to form the auxiliary circuit HS10, a Blümlein circuit, the connecting point of the auxiliary circuit with respect to A* being the inner end of the inductance $L_{20}$, and the outer end being connected to the branch $L_{10} - S_L$.

Figure 14:
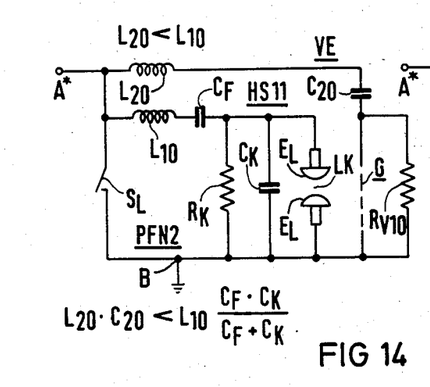
FIG. 14 is also a circuit diagram of an embodiment of the invention basically like that of FIG. 12 wherein, however, the main circuit and the excitation circuit, respectively, have a pulse-forming network which forms a charge transfer circuit.
Figure 15:
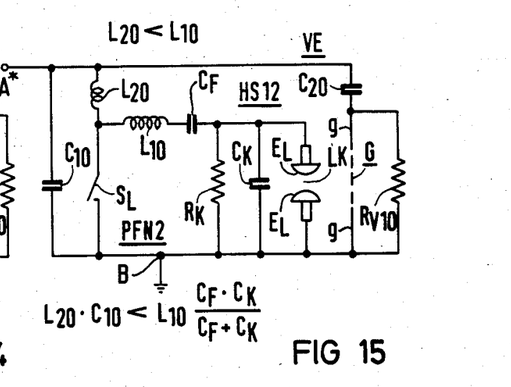
FIG. 15 is a circuit diagram of an embodiment like that of FIG. 14 wherein the auxiliary circuit for the preionizing device is supplemented to form a Blümlein circuit by connecting a supplemental capacity in parallel or shunt.

Further variations or modifications are shown in FIG. 14, the main discharge circuit being based upon a charge transfer circuit. The auxiliary circuit according to FIG. 14, which corresponds to that according to FIG. 12 is supplemented according to FIG. 15 to form a Blümlein circuit according to FIG. 13.

It is apparent from FIGS. 12 to 15 that the switching element $S_L$ of the pulse-forming network PFN1 (Blümlein circuit) and PFN2 (charge transfer circuit), respectively, is used jointly as a switching element of the preionization auxiliary circuits HS9 to HS12. The values of the circuit elements $L_{20}$, $C_{20}$, $C_{10}$ of the auxiliary circuits HS9 to HS12 required for the properly timed firing of the surface discharge gaps G are indicated by inequalities in relation to the circuit elements $L_{10}$, $C_F$, $C_K$, respectively, of the main circuit. These auxiliary circuits are suited particularly for $CO_2$-lasers, wherein a response of the preionization devices which is not so fast is required, for example, in Excimer lasers.

Figure 16:
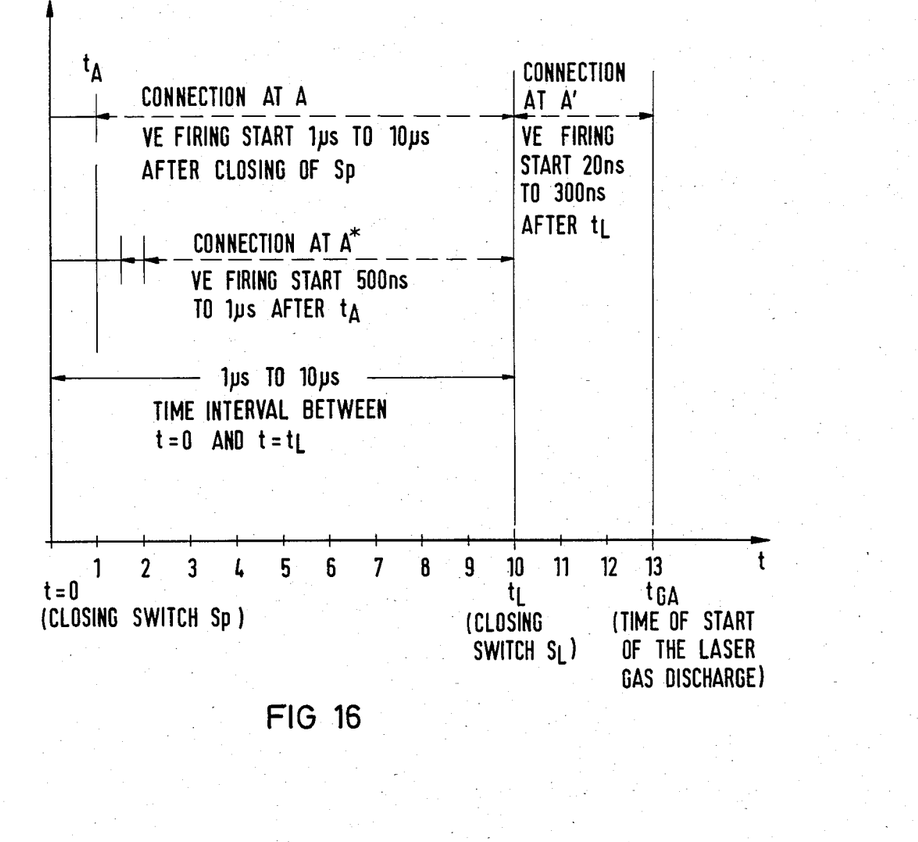
FIG. 16 is a plot diagram wherein various ranges of firing onset of the preionizing devices are plotted along the time t axis.

FIG. 16 further shows a diagram for illustrating the possible instant of onset or application of the firing of the preionization devices VE in dependence upon the connection of the auxiliary circuits thereof to the circuit points A, A* or A'. All further details follow from the explanations of the diagram. It has been found advantageous for the preionizing devices VE, H, HS3 to HS8 having preionizing rods h to operate in accordance with the principle of a corona discharge and, for this purpose, to have a rod-shaped electrically conducting electrode core and an insulating dielectric jacket.

The foregoing is a description corresponding in substance to German Application P No. 33 14 157.6, dated Apr. 19, 1983, the International priority of which is being cvlaimed for the instant application, and which is hereby made part of this application. Any material discrepancies between the foregoing specification and the aforementioned corresponding German application are to be resolved in favor of the latter.

We claim:

1. In a laser system, an excitation circuit excitable by a maximally homogeneous, arc-free capacitor discharge in a gas space of a laser head between at least two mutually spaced-apart laser electrodes, the excitation circuit comprising at least one fast acting high-voltage switch activatable via a pulse-forming network connected thereto for generating high-voltage pulses at the laser electrodes; first and second stripline capacitors connected to said pulse-forming network and said high-voltage switch; a preionization device connected to the laser electrodes and having a plurality of members of at least one of groups of members consisting of surface discharge gap members and preionization rod members, together with auxiliary circuits connected thereto, said auxiliary circuits being connected to said pulse-forming network for providing all auxiliary voltages and currents for operating said preionization device, said auxiliary circuits being connected, in addition to ground potential of the excitation circuit, to at least one of three discrete circuit points of which one point is connected to a high-voltage input of said pulse-forming network, a second point is connected to a high-voltage branching point of said high-voltage switch and one of said stripline capacitors, and a third point is connected directly to the laser electrodes having high potential, for controlling the instant of onset of the laser gas discharge and the time relationship between applying a high-voltage pulse to the laser electrodes and applying a firing pulse to poles of said preionization device.

2. An excitation circuit according to claim 1 wherein said preionization device comprises said surface discharge gaps, and said auxiliary circuits of said preionization device are connected to a plurality of said fast-acting switches, and including at least one loading capacitor and a first impedance serially connected with a parallel circuit formed of one of said surface discharge gaps and a second impedance having a resistance greater than that of said one surface discharge gap, said loading capacitor and said first impedance of said auxiliary circuit having relatively small values compared to corresponding capacitors and inductive impedances of the pulse-forming network.

3. An excitation circuit according to claim 2 wherein said fast-acting high-voltage switch forms part of said auxiliary circuit of said surface discharge gap, said high voltage switch having a high-voltage terminal connected to a junction point of the series connection of said loading capacitor and said first impedance.

4. An excitation circuit according to claim 1 wherein said preionization device comprises said preionization rods disposed at a given breakdown distance from the appertaining laser electrode, a respective auxiliary circuit comprising a switching element for controlling a pulse connection to said preionization rods with adjustable instant of firing and adjustable breakdown voltage, respectively, said instant of firing of said switching element being further controllable by a connection of said high-voltage supply of said auxiliary circuit both to ground potential of the pulse-forming network and to at least said third circuit point connected directly to said high-potential laser electrode.

5. An excitation circuit according to claim 4 wherein said switching element of said auxiliary circuit connected to said preionization rods is a small spark gap.

6. An excitation circuit according to claim 5 wherein said small spark gap is shunted by a small capacitance.

7. An excitation circuit according to claim 5 wherein said small spark gap is an overvoltage arrester.

8. An Excitation circuit according to claim 4 wherein the auxiliary circuits connected to said preionization device are connected to said second circuit point of said high-voltage input of the pulse-forming network via an impedance.

9. Excitation circuit according to claim 4 wherein said preionization rods have inner conductors connected directly to said second circuit point of said high-voltage input of the pulse-forming network.

10. An Excitation circuit according to claim 4 wherein said preionization rods of said preionization device are formed of a rod-shaped, electrically conducting electrode core and an insulating dielectric jacket.

11. An excitation circuit according to claim 1 wherein said stripline capacitors have a liquid dielectric, the pulse-forming network being operatable with pulse charging of said stripline capacitors thereof, and being connected on the input side thereof to a pulse charging capacitor via a pulse inductance and a pulse switch.

12. An excitation circuit according to claim 11 wherein said liquid dielectric is chemically pure water.

13. An excitation circuit according to claim 1 wherein a respective auxiliary circuit of said preionization device is a Blümlein switching circuit with a fast-acting high-voltage switch.

14. An excitation circuit according to claim 1 wherein said preionization devices comprises said surface discharge gaps, said fast-acting high-voltage switch with the pulse-forming network of a main discharge circuit being common to said auxiliary circuits of said surface discharge gaps, and said auxiliary circuits being connected to the same one of said circuit points to which the pulse-forming network is connected.

15. An excitation circuit according to claim 14 wherein a respective auxiliary circuit is a Blümlein circuit, and said Blümlein auxiliary circuit is connected to said circuit point at a branching point of a shunt capacitance, an inductance and a capacitance of said Blümlein auxiliary circuit, and is connected to the pulse-forming network by an outer end of said inductance at a junction point of said fast-acting high-voltage switch and an inductance of the pulse-forming network.

16. An excitation circuit according to claim 1 wherein the laser system is a TE high-energy laser.

17. An excitation circuit according to claim 1 wherein said pulse-forming network is a Blümlein circuit.

18. An excitation circuit according to claim 1 wherein said pulse-forming network is a charge-transfer switching circuit.

* * * * *